US008098898B2

(12) United States Patent
Shimazu et al.

(10) Patent No.: US 8,098,898 B2
(45) Date of Patent: Jan. 17, 2012

(54) MOTION DETECTION DEVICE, MOS (METAL-OXIDE SEMICONDUCTOR) INTEGRATED CIRCUIT, AND VIDEO SYSTEM

(75) Inventors: Yoshihisa Shimazu, Osaka (JP); Shinji Kitamura, Osaka (JP)

(73) Assignee: Panasonic Corporation, Osaka (JP)

( * ) Notice: Subject to any disclaimer, the term of this patent is extended or adjusted under 35 U.S.C. 154(b) by 989 days.

(21) Appl. No.: 11/907,167

(22) Filed: Oct. 10, 2007

(65) Prior Publication Data

US 2008/0192985 A1  Aug. 14, 2008

(30) Foreign Application Priority Data

Oct. 27, 2006 (JP) ................................ 2006-293102

(51) Int. Cl.
*G06K 9/00* (2006.01)
(52) U.S. Cl. .................................... 382/107; 375/240.02
(58) Field of Classification Search .................. None
See application file for complete search history.

(56) References Cited

U.S. PATENT DOCUMENTS

| 6,014,181 | A * | 1/2000 | Sun .............................. 348/699 |
| 6,128,047 | A * | 10/2000 | Chang et al. ................. 348/699 |
| 6,178,265 | B1 * | 1/2001 | Haghighi ..................... 382/236 |
| 2003/0052995 | A1 * | 3/2003 | Hsu et al. ..................... 348/448 |
| 2003/0053543 | A1 * | 3/2003 | Bhaumik et al. ......... 375/240.16 |
| 2003/0142749 | A1 | 7/2003 | Hong |
| 2004/0081238 | A1 * | 4/2004 | Parhy ....................... 375/240.16 |
| 2004/0125996 | A1 * | 7/2004 | Eddowes et al. .............. 382/128 |
| 2005/0135481 | A1 * | 6/2005 | Sung ........................ 375/240.16 |
| 2005/0190976 | A1 | 9/2005 | Todoroki et al. |
| 2005/0207493 | A1 | 9/2005 | Kobayakawa |
| 2006/0133496 | A1 * | 6/2006 | Tsai ......................... 375/240.16 |
| 2006/0203905 | A1 * | 9/2006 | Hsia .......................... 375/240.2 |
| 2007/0092006 | A1 * | 4/2007 | Malayath ................. 375/240.16 |
| 2008/0170616 | A1 * | 7/2008 | Hwang et al. ............ 375/240.16 |
| 2008/0192985 | A1 * | 8/2008 | Shimazu et al. .............. 382/107 |

FOREIGN PATENT DOCUMENTS

| CN | 1436002 | 8/2003 |
| CN | 1791224 | 6/2006 |
| JP | 04-150284 | 5/1992 |
| JP | 2004-193906 | 7/2004 |
| JP | 2005-210647 | 8/2005 |
| WO | WO 2004/091222 | * 10/2004 |
| WO | WO 2006/004065 A1 | 1/2006 |

OTHER PUBLICATIONS

Chinese Office Action issued in Chinese Patent Application No. 200710165531.6, mailed Sep. 8, 2010.

* cited by examiner

*Primary Examiner* — Jingge Wu
*Assistant Examiner* — Tahmina Ansari
(74) *Attorney, Agent, or Firm* — McDermott Will & Emery LLP

(57) ABSTRACT

A motion detection device includes a current image memory, a reference image memory, a reference image memory control section, and a motion detection section. When the motion detection section detects a motion vector for a first current macroblock image, the reference image memory control section determines a motion estimation range by using a surrounding motion vector being a motion vector detected for a current macroblock image present around the first current macroblock.

9 Claims, 16 Drawing Sheets

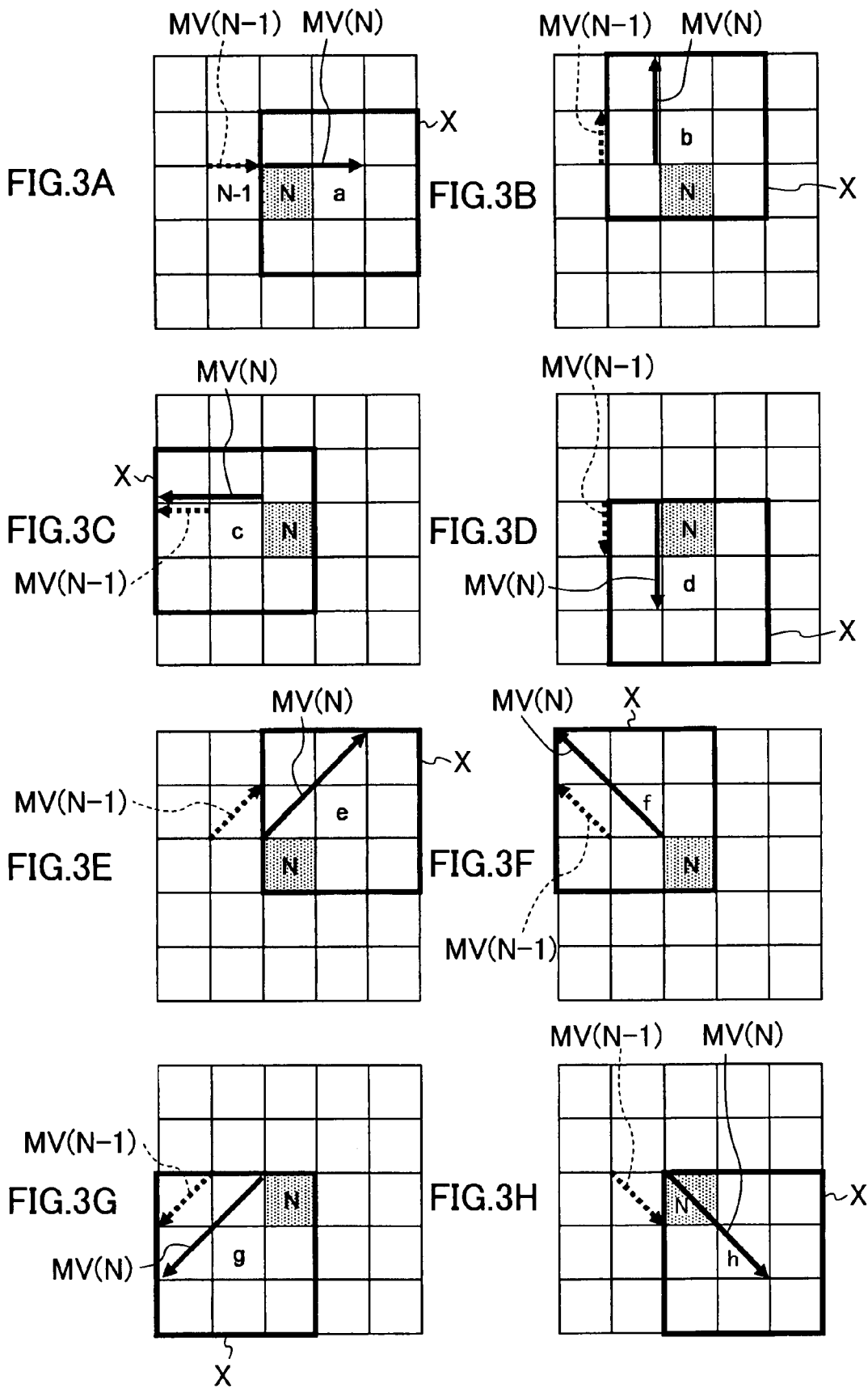

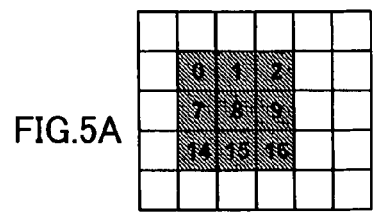
FIG.5A
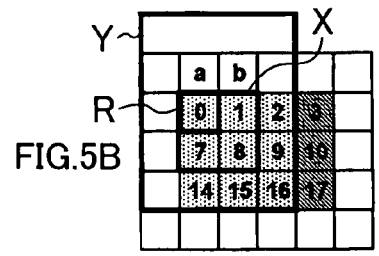
FIG.5B
FIG.5C
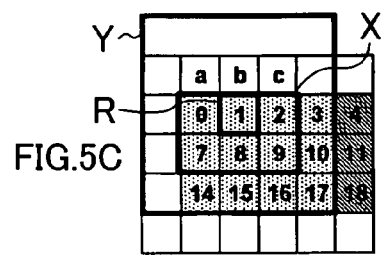
FIG.5D
FIG.5E
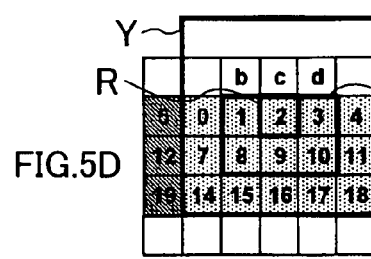
FIG.5F
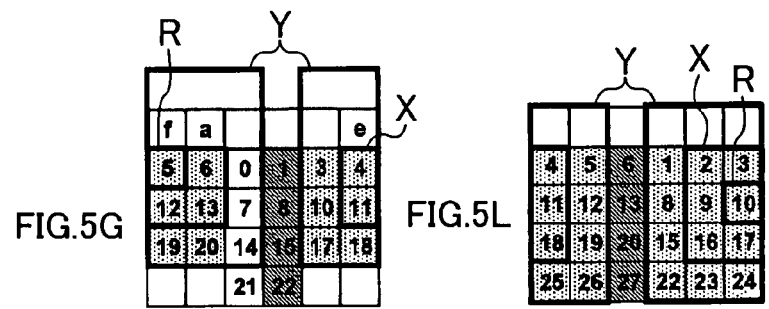
FIG.5G
FIG.5H
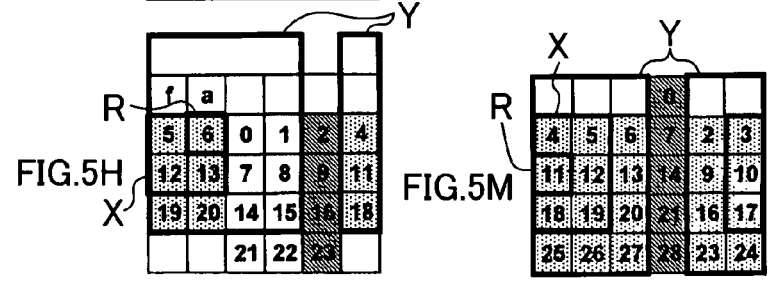
FIG.5I
FIG.5J
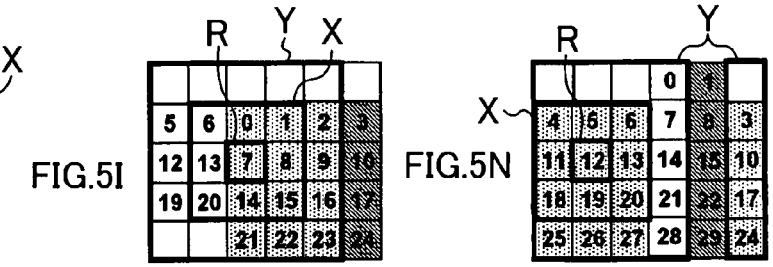
FIG.5K
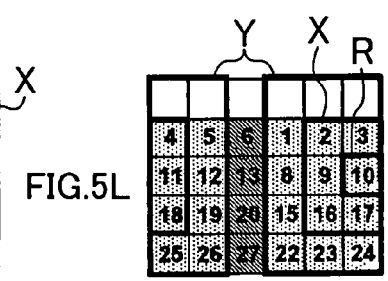
FIG.5L
FIG.5M
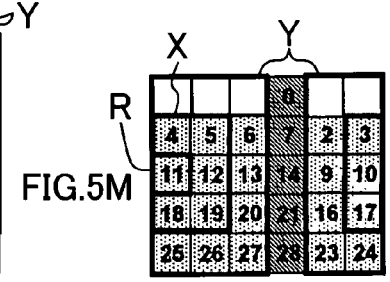
FIG.5N
FIG.5O
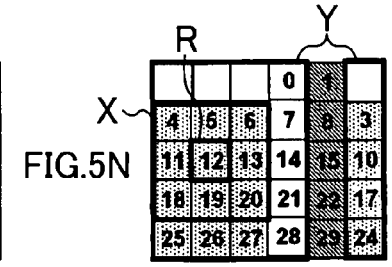
FIG.5P

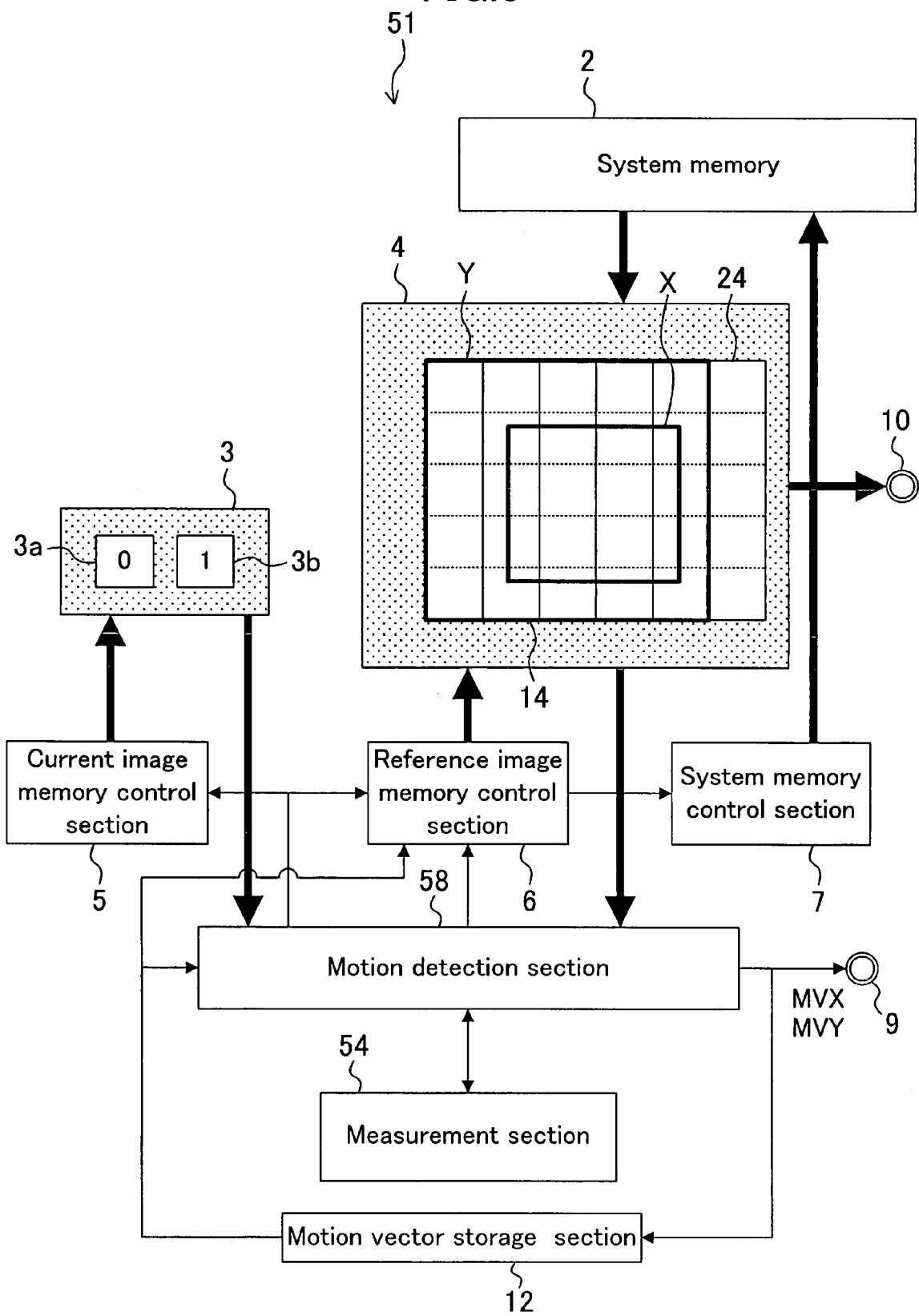

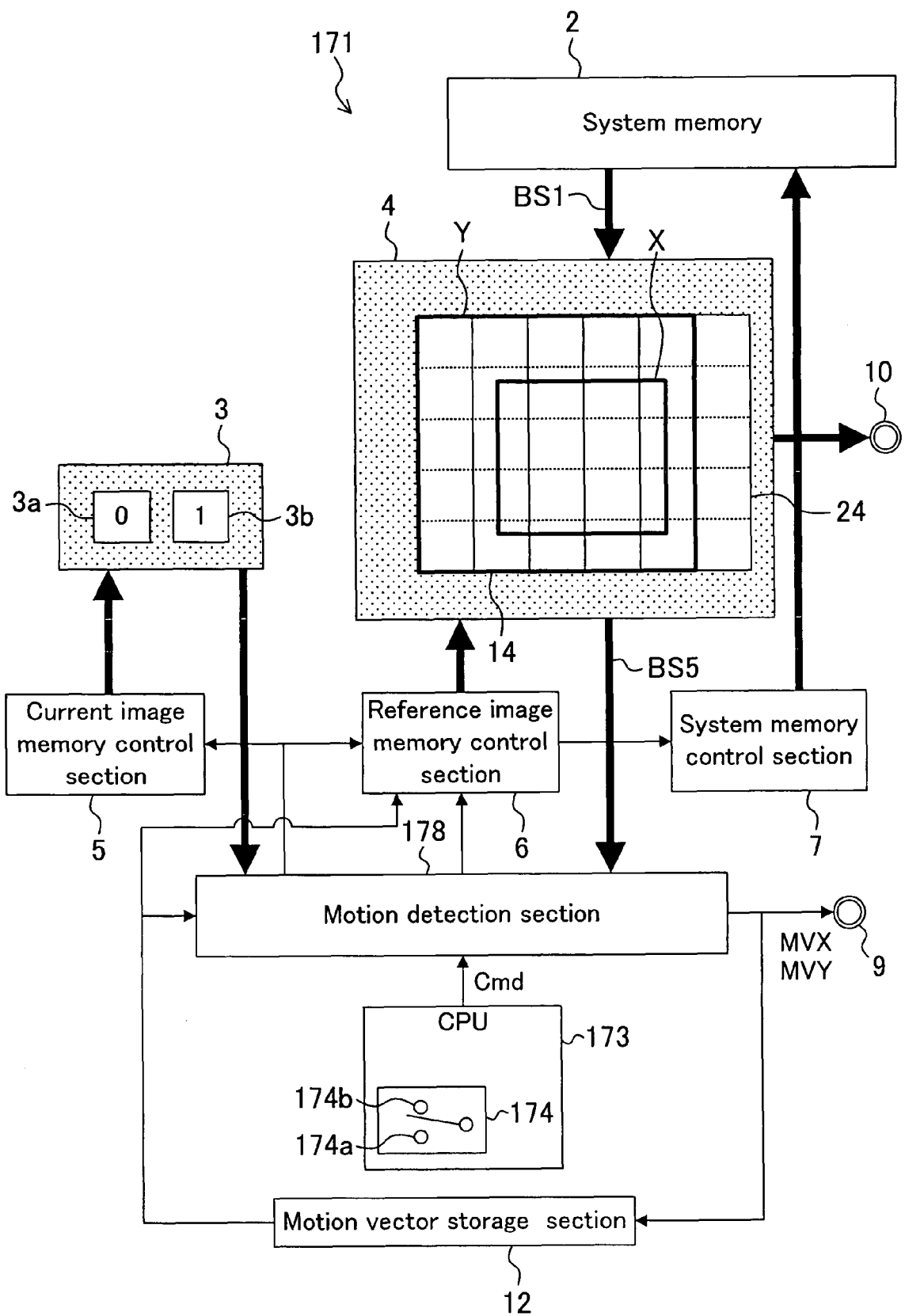

MOTION DETECTION DEVICE, MOS (METAL-OXIDE SEMICONDUCTOR) INTEGRATED CIRCUIT, AND VIDEO SYSTEM

BACKGROUND OF THE INVENTION

1. Field of the Invention

The present invention relates to a motion detection device for use in compressing a moving picture, an MOS integrated circuit including such a motion detection device, and a video system using such a motion detection device.

2. Description of the Background Art

There are signal processing techniques at present capable of compressing images with high compression rates, and they have been used in digital still cameras, digital video cameras, etc.

A commonly-known method for compressing a moving picture is the MPEG (Moving Picture Experts Group) method. The MPEG method employs motion compensation, with which images can be compressed efficiently by encoding the displacement of an object and the image difference data. The motion compensation technique calculates a motion vector representing the displacement of an object by using a calculation method such as a block matching method.

For example, Japanese Laid-Open Patent Publication No. 2005-210647 discloses a detection device and a detection method for detecting a motion vector. Where the detection device disclosed in Japanese Laid-Open Patent Publication No. 2005-210647 detects a motion vector for a second current macroblock image adjacent to a first current macroblock image after detecting a motion vector for the first current macroblock image, it is possible to suppress a reference macroblock image from being transferred redundantly from a reference frame memory to a reference image data buffer.

SUMMARY OF THE INVENTION

With the motion detection device of the present invention, a motion estimation range can be determined each time a motion detection is performed. Thus, by performing a motion detection using the motion detection device of the present invention, it is possible to perform a motion estimation with a high precision even with a fast-moving image.

BRIEF DESCRIPTION OF THE DRAWINGS

FIGS. 3A to 3H are diagrams illustrating a method for determining a motion estimation range.

FIGS. 5A to 5P are diagrams illustrating an operation of a motion detection device according to Embodiment 2.

FIG. 8 is a block diagram showing a configuration of a motion detection device according to Embodiment 5.

FIG. 15 is a block diagram showing a configuration of a motion detection device according to another example of Embodiment 11.

DETAILED DESCRIPTION OF THE PREFERRED EMBODIMENTS

The motion estimation range is pre-determined with known motion detection devices, and if there is a fast-moving object, the object may be outside the motion estimation range. Thus, a motion cannot be estimated with a high precision in some cases. This will be described in detail with reference to FIGS. 16A to 16D.

Figure 16A:
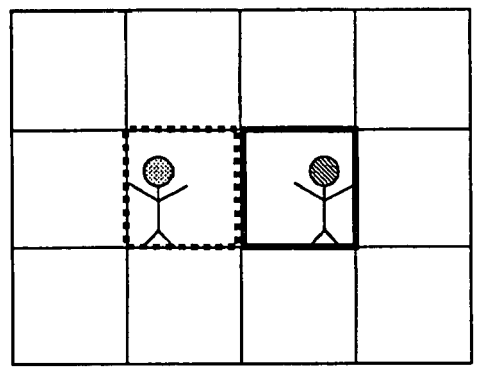
FIGS. 16A to 16D are diagrams illustrating a known motion compensation.
Figure 16B:
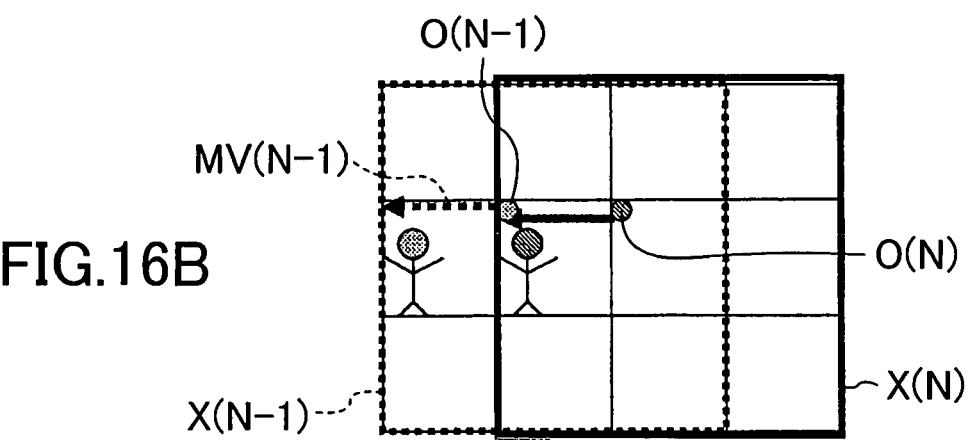
Figure 16C:
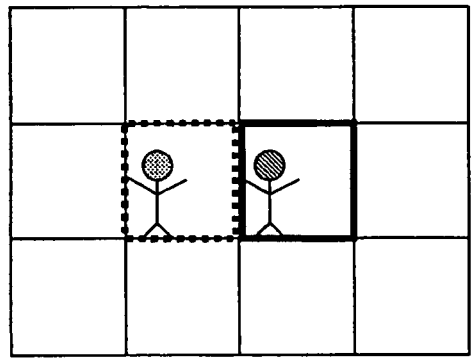
Figure 16D:
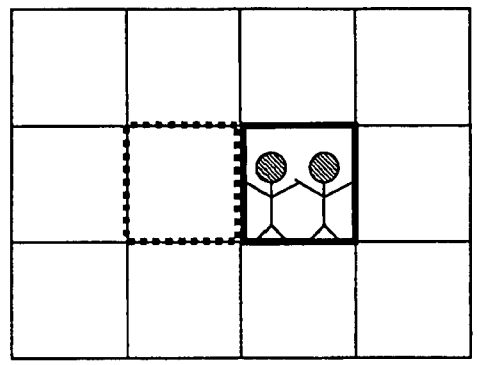

FIG. 16A shows a current frame being encoded, FIG. 16B a reference frame, FIG. 16C a motion compensation frame, and FIG. 16D a difference frame. The difference frame (FIG. 16D) is a frame obtained by subtracting the motion compensation frame (FIG. 16C) from the current frame (FIG. 16A). In FIGS. 16A, 16C and 16D, a region delimited by a thick line represents an $N^{th}$ current macroblock, and a region delimited by a broken line represents an $(N-1)^{th}$ current macroblock. In FIG. 16B, a region delimited by a thick line is the motion estimation range for the $N^{th}$ current macroblock, and a region delimited by a broken line is the motion estimation range for the $(N-1)^{th}$ current macroblock.

In the current frame shown in FIG. 16A, attention is drawn to the object being present in a right portion of the $N^{th}$ current macroblock. Then, while the motion estimation range X(N) of the $N^{th}$ current macroblock is the region delimited by a thick line in FIG. 16B, the motion estimation starting point O(N) of the $N^{th}$ current macroblock is moved from the upper left portion of the $N^{th}$ current macroblock by the motion vector MV(N-1) for the $(N-1)^{th}$ current macroblock. Then, the motion estimation is performed, starting from the motion estimation starting point, which has been moved. Therefore, on the left side, the motion estimation range is as narrow as one macroblock starting from the upper left starting point, whereby the motion vector is smaller than it is supposed to be as shown in FIG. 16C, thus resulting in a difference as shown in FIG. 16D. This leaves a problem that an appropriate motion compensation cannot be performed.

Preferred embodiments of the present invention will now be described with reference to the drawings. Note that the present invention is not limited to the following embodiments.

Embodiment 1

Figure 1:
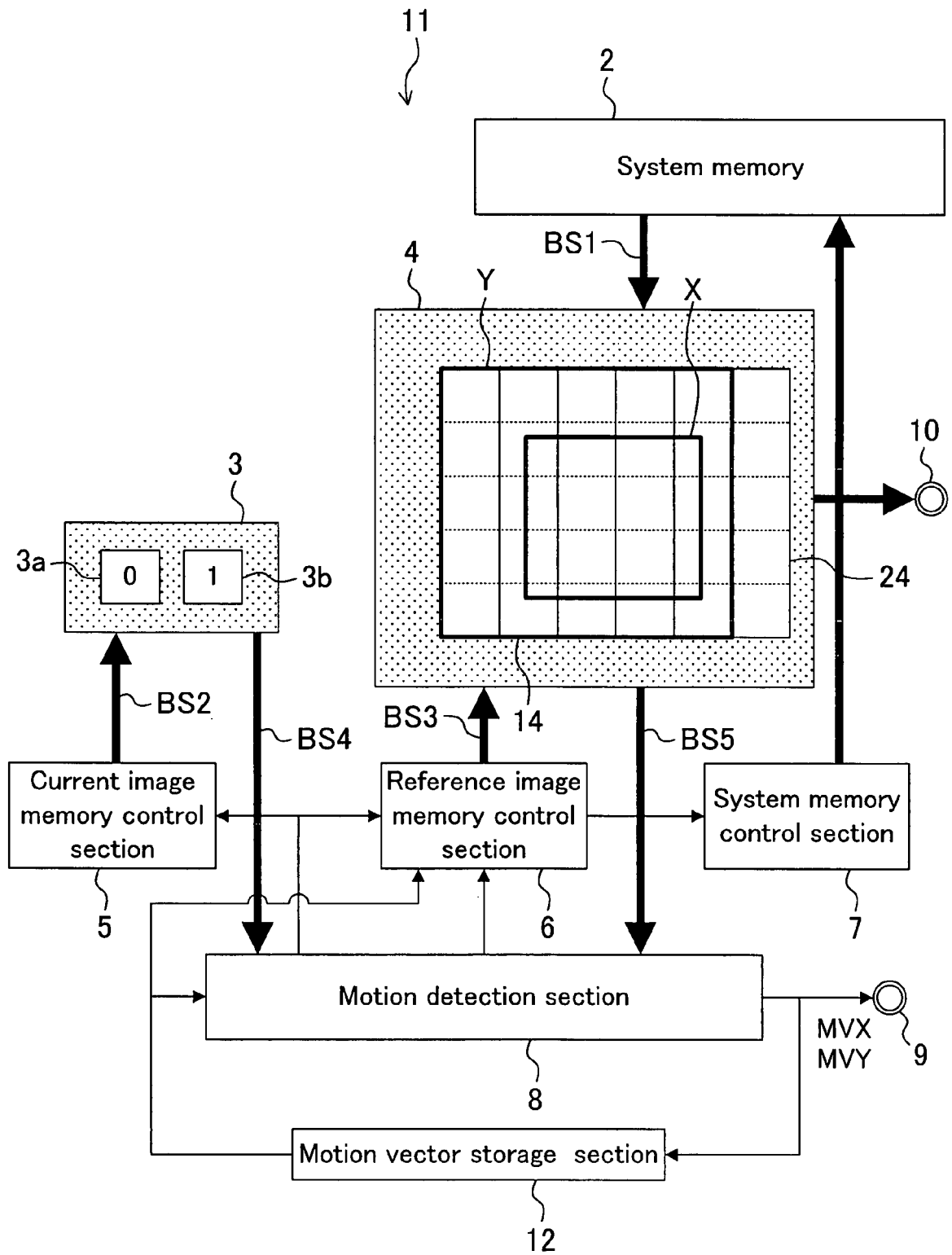
FIG. 1 is a block diagram showing a configuration of a motion detection device according to Embodiment 1.

FIG. 1 shows a configuration of a motion detection device 11 according to Embodiment 1. FIG. 1 shows a motion detection device for a case where the size of the motion estimation range X is 3×3 macroblocks. While each of BS1 to BS5 in FIG. 1 represents two data bus lines, it is depicted as a single line in FIG. 1 for the sake of simplicity.

The motion detection device 11 of the present embodiment includes a system memory 2, a current image memory 3, a reference image memory 4, a current image memory control section 5, a reference image memory control section 6, a system memory control section 7, a motion detection section 8, and a motion vector storage section 12, and calculates the motion vector of the current macroblock image with reference to the reference macroblock image.

A reference macroblock image as used herein is one of a plurality of pieces into which a reference frame image is divided (e.g., into 64 pieces), and includes 16×16 pixels, for example. Similarly, a current macroblock image as used herein is one of a plurality of pieces into which a current frame image is divided (into 64 pieces in the present embodiment).

The system memory 2 is an SDRAM (Synchronous Dynamic Random Access Memory) for storing the reference frame image. The reference image memory 4 is connected to the system memory 2 via the data bus BS1.

The reference image memory 4 is a 2-port SRAM (Static Random Access Memory). One of the two ports is a write port, and the other a read port. The reference image memory 4 stores images (reference images) of a subset of a plurality of reference macroblocks of a reference frame. Assigned to the reference image memory 4 are an estimation bank memory (a region delimited by a thick line in FIG. 1) 14 and a spare transfer bank memory 24. The estimation bank memory 14 stores an image over a range Y greater than the motion estimation range X (specifically, images of 5×5 reference macroblocks), whereas the spare transfer bank memory 24 stores data of images of 1×5 reference macroblocks. The motion estimation range X can be determined within the range Y. The reference image memory control section 6 is connected to the estimation bank memory 14 and the spare transfer bank memory 24 of the reference image memory 4 via the data bus BS3.

The reference image memory control section 6 individually controls the estimation bank memory 14 and the spare transfer bank memory 24 of the reference image memory 4. Specifically, where the motion detection device 11 performs a motion detection for the $N^{th}$ current macroblock image, the reference image memory control section 6 controls the memories so that the estimation bank memory 14 stores the reference macroblock image present at the same position as the $N^{th}$ current macroblock image (hereinafter referred to as the "$N^{th}$ reference macroblock image") and the surrounding reference macroblock images, whereas the spare transfer bank memory 24 stores the $(N+1)^{th}$ reference macroblock image and those of the surrounding reference macroblock images that are not stored in the estimation bank memory 14.

Where the motion detection device 11 performs a motion detection for the $N^{th}$ current macroblock image, the reference image memory control section 6 determines the motion estimation range X with reference to the motion vector of a current macroblock image around the $N^{th}$ current macroblock. This will later be described in detail.

When the motion detection has been performed for all current macroblock images, the reference image memory control section 6 outputs a switching signal to the system memory control section 7.

When a switching signal from the reference image memory control section 6 is received, the system memory control section 7 controls the system memory 2 so that the image stored in the reference image memory 4 is switched to another.

The current image memory 3 includes two current bank memories 3a and 3b. The current bank memories 3a and 3b are 1-port SRAMs (Static Random Access Memories), which are physically independent of each other, and each store pixel data of one current macroblock image. The current image memory control section 5 is connected to the current bank memories 3a and 3b of the current image memory 3 via the data bus BS2.

The current image memory control section 5 individually controls the current bank memories 3a and 3b. Specifically, when the motion detection device 11 is performing a motion detection for the $N^{th}$ current macroblock image, the current image memory control section 5 controls the memory so that the $(N+1)^{th}$ current macroblock image is stored in the current image memory 3.

The motion detection section 8 is connected to each of the current bank memories 3a and 3b of the current image memory 3 via the data bus BS4, and to each of the estimation bank memory 14 and the spare transfer bank memory 24 of the reference image memory 4 via the data bus BS5, and performs a motion detection for the $N^{th}$ current macroblock image and prepares for a motion detection for the $(N+1)^{th}$ current macroblock image. When a motion detection is performed for the $N^{th}$ current macroblock image, the motion detection section 8 controls the current image memory control section 5 so that the $N^{th}$ current macroblock image is transferred from the current image memory 3 to the motion detection section 8, and controls the reference image memory control section 6 so that the reference macroblock image present within the motion estimation range X is transferred from the reference image memory 4 to the motion detection section 8.

When preparation for a motion detection for the $(N+1)^{th}$ current macroblock image is performed, the motion detection section 8 controls the current image memory control section 5 so that the $(N+1)^{th}$ current macroblock image is stored in the current bank memory 3b of the current image memory 3, and controls the reference image memory control section 6 so that the $(N+1)^{th}$ reference macroblock image is transferred from the system memory 2 to the spare transfer bank memory 24 of the reference image memory 4.

The motion detection section 8 outputs the calculated motion vectors (MVX and MVY) to the outside of the motion detection device 11 via an output terminal 9, and outputs motion-compensated reference macroblock image to the outside of the motion detection device 11 via an output terminal 10.

The motion vector storage section 12 is connected to the reference image memory control section 6 and the motion detection section 8, and stores motion vectors MVX and MVY, which are output from the motion detection section 8 to the output terminal 9. The motion vectors stored in the motion vector storage section 12 are used, when performing a motion estimation for the current macroblock after the vectors are stored, as information of movements around the current macroblock. In other words, the reference image memory control section 6 sets the motion estimation range X by using the motion vectors stored in the motion vector storage section 12.

Figure 2A:
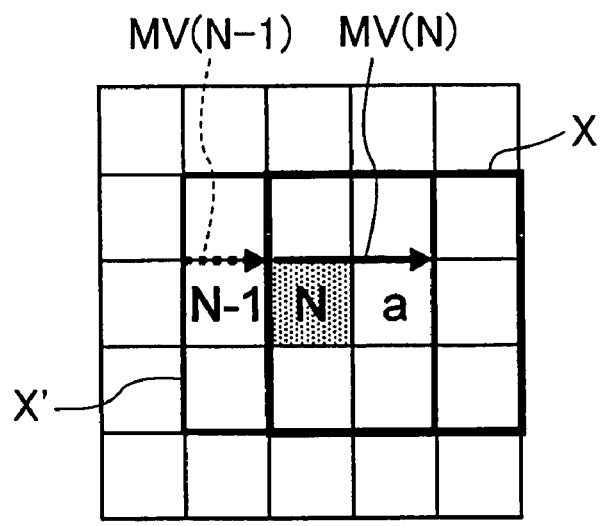
FIGS. 2A and 2B are diagrams illustrating a method for determining a motion estimation range.
Figure 2B:
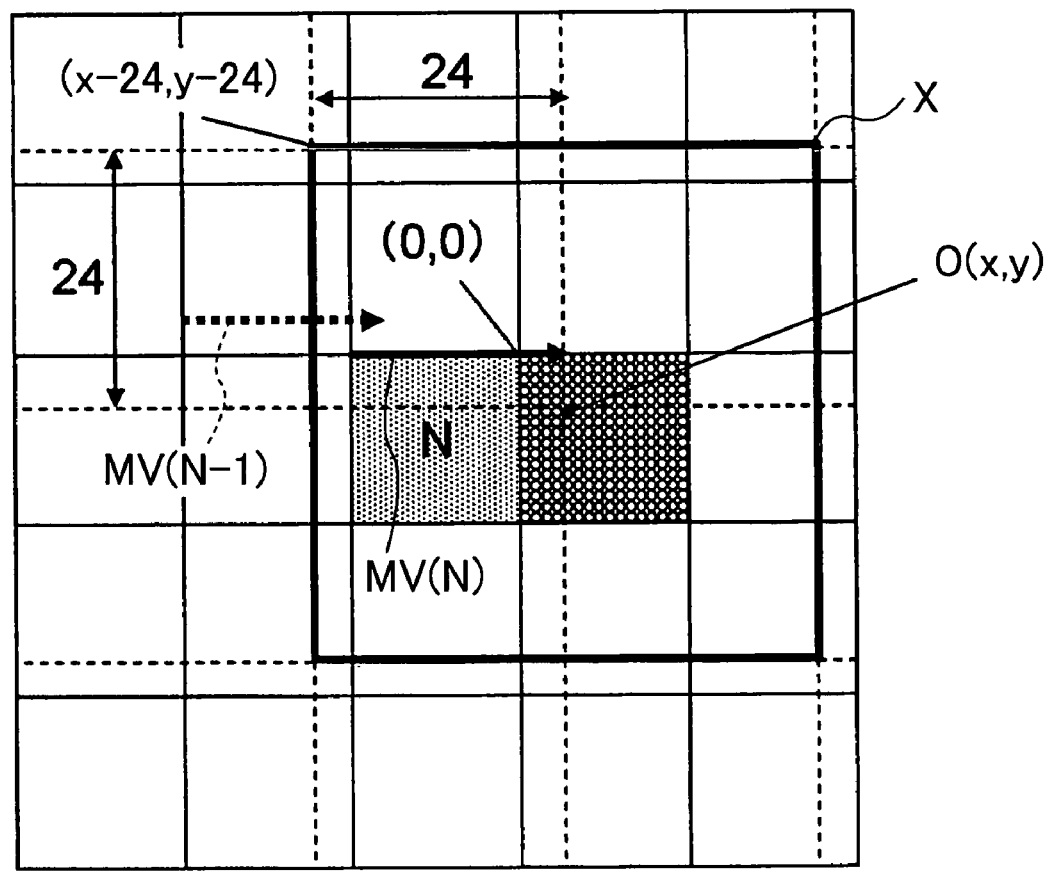

Referring to FIGS. 2A and 2B, a method for setting the motion estimation range in the motion detection device 11 of the present embodiment will be described, in comparison with a conventional method.

When a motion detection is performed for the $N^{th}$ current macroblock image, a conventional method sets, as the motion estimation range, a range X' that is centered about the $N^{th}$ reference macroblock image.

However, where the motion vector of the $(N-1)^{th}$ current macroblock image is MV(N−1) as shown in FIG. 2A, it is considered that the $(N-1)^{th}$ current macroblock image has moved over time from right to left in the figure. Then, it can be presumed that the $N^{th}$ current macroblock image has also moved over time from right to left in the figure. In other words, it can be presumed that the $N^{th}$ current macroblock image is located to the right of the $N^{th}$ reference macroblock in the reference frame image. Therefore, if a motion estimation is performed across the range X' shown in FIG. 2A as with the conventional method, it is possible that the motion of the $N^{th}$ current macroblock image cannot be detected.

In view of this, when the motion detection device 11 of the present embodiment performs a motion detection for the $N^{th}$ current macroblock image, the motion detection device 11 determines the motion estimation range with reference to the motion vector of a current macroblock image around the $N^{th}$ current macroblock image. Specifically, in a case as shown in FIG. 2A, it is presumed that the $N^{th}$ current macroblock image is located to the right of the $N^{th}$ reference macroblock in the reference frame image as described above. Therefore, the motion estimation range is shifted to the right.

In other words, where a motion detection is performed for the $N^{th}$ current macroblock image, the reference image memory control section 6 moves the estimation starting point by MV(N−1) from a predetermined point in the $N^{th}$ reference macroblock. Then, the estimation starting point moves into a block (the block "a" shown in FIG. 2A) to the right of the $N^{th}$ reference macroblock, and the reference image memory control section 6 accordingly sets the range X centered about the block "a" as the motion estimation range.

In the above description, when a motion estimation is performed for the $N^{th}$ current macroblock image, the motion estimation range is set with reference to the motion vector of the current macroblock image that is present to the left of the $N^{th}$ current macroblock image. However, it is understood that when a motion estimation is performed for the $N^{th}$ current macroblock image, the motion estimation range may be set with reference to, for example, the motion vector of the current macroblock image that is present on the upper side of the $N^{th}$ current macroblock image or that of the current macroblock image that is present on the upper right side of the $N^{th}$ current macroblock image.

The reference image memory control section 6 may set the motion estimation range X centered about a reference macroblock that includes the estimation starting point therein, as described above (FIG. 2A), or may set the motion estimation range X centered about the estimation starting point O(x,y) as shown in FIG. 2B. While there are 3×3 reference macroblocks in the motion estimation range X in the case shown in FIG. 2A, there may be more reference macroblocks than 3×3 in the motion estimation range X in the case shown in FIG. 2B. If x and y in the estimation starting point O(x,y) are both a multiple of 16 (including 0), there are 3×3 reference macroblocks in the motion estimation range X. However, if either x or y is not a multiple of 16 (including 0), there are 3×4 reference macroblocks in the motion estimation range X, and if x and y are both not a multiple of 16 (including 0), there are 4×4 reference macroblocks in the motion estimation range X.

Therefore, for motion vectors MV(N−1) of the $(N-1)^{th}$ current macroblock image as shown in FIGS. 3A to 3H, the reference image memory control section 6 can set motion estimation ranges as shown in FIGS. 3A to 3H, respectively.

Figure 4A:
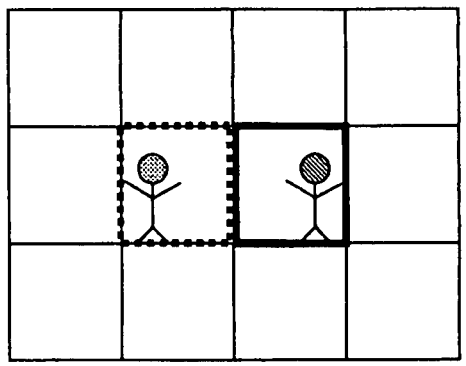
FIGS. 4A to 4D are diagrams illustrating motion compensation in Embodiment 1.
Figure 4B:
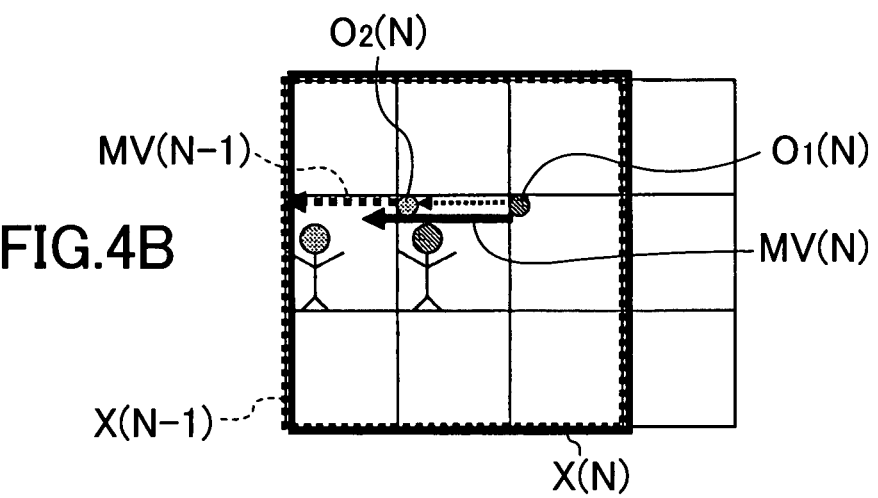
Figure 4C:
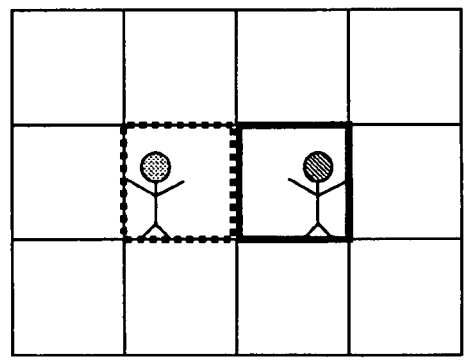
Figure 4D:
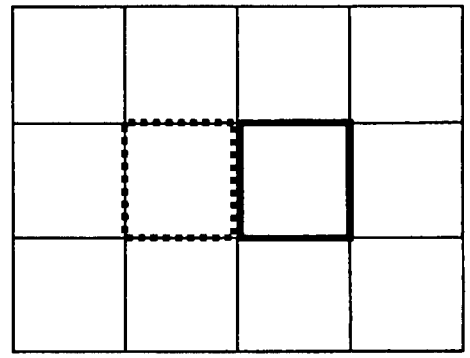

Thus, with the motion detection device 11 of the present embodiment, the reference image memory control section 6 determines the motion estimation range each time a motion detection is performed, whereby it is possible to perform a motion compensation with a high precision as shown in FIGS. 4A to 4D. FIG. 4A shows a current frame, FIG. 4B a reference frame, FIG. 4C a motion compensation frame, and FIG. 4D a difference frame. In FIGS. 4A, 4B and 4D, the $N^{th}$ current macroblock is delimited by a thick line, and the (N−1)$^{th}$ current macroblock by a broken line. In FIG. 4B, the $N^{th}$ reference macroblock is delimited by a thick line, and the (N−1)$^{th}$ reference macroblock by a broken line.

Referring to FIG. 4A, attention is drawn to the object being present in a right portion of the $N^{th}$ current macroblock. Then, since the motion vector of the $(N-1)^{th}$ current macroblock image is MV(N−1) as shown in FIG. 4B, the reference image memory control section 6 moves the estimation starting point of the $N^{th}$ current macroblock image by MV(N−1) from the point $O_1(N)$ at the upper left corner of the $N^{th}$ current macroblock, and sets the motion estimation range X(N) of the $N^{th}$ current macroblock image based on the moved estimation starting point $O_2(N)$. Then, the motion detection section 8 calculates the motion vector within the motion estimation range X(N) to calculate the motion compensation frame (FIG. 4C). Thus, there is no difference in the difference frame (FIG. 4D), and it is possible to perform a motion compensation with a high precision.

An operation of the motion detection device 11 of the present embodiment will now be described. Consider a case where the motion detection device 11 performs a motion detection for the $N^{th}$ current macroblock image.

First, the current image memory control section 5 stores the $N^{th}$ current macroblock image in the current bank memory 3a of the current image memory 3.

At the same time, the reference image memory control section 6 determines a motion estimation range in the image stored in the reference image memory 4 by using the motion vector of a current macroblock image around the $N^{th}$ current macroblock image (e.g., the $(N-1)^{th}$ current macroblock image).

Then, the motion detection section 8 transfers the $N^{th}$ current macroblock image from the current bank memory 3a of the current image memory 3 to the motion detection section 8 via the data bus BS4, and transfers those of the reference macroblock images that are present within the motion estimation range from the reference image memory 4 to the motion detection section 8 via the data bus BS5.

Then, the motion detection section 8 calculates a motion vector for the NT current macroblock image, and outputs the calculation results (MVX and MVY) to the outside of the motion detection device 11 via the output terminal 9.

In parallel to the calculation of the motion vector for the $N^{th}$ current macroblock image, the device prepares for the calculation of a motion vector for the $(N+1)^{th}$ current macroblock image. Specifically, the current image memory control section 5 stores the $(N+1)^{th}$ current macroblock image in the current bank memory 3b of the current image memory 3. The reference image memory control section 6 determines a motion estimation range for a motion detection of the $(N+1)^{th}$ current macroblock image by using the motion vector of a reference macroblock image around the $(N+1)^{th}$ reference macroblock image. Moreover, those of the reference macroblock images present within the motion estimation range of the $N+1)^{th}$ current macroblock image that are not stored in the reference image memory 4 are moved by the motion detection section 8 from the system memory 2 to the spare transfer bank memory 24 of the reference image memory 4.

The above process is repeated to perform a motion detection for each of the current macroblock images, which together form the current frame image. When the motion detection is complete for the last current macroblock image of the current frame image, the reference image memory control section 6 outputs a switching signal to the system memory control section 7. Then, the system memory control section 7 controls the system memory 2 so that the image stored in the reference image memory 4 is switched to another.

As described above, with the motion detection device 11 of the present embodiment, the reference image memory control section 6 determines a motion estimation range each time the motion detection section 8 performs a motion detection. Therefore, even if the image involves substantial movements, it is possible to perform a motion estimation for the image with a high precision. In other words, it is possible to make the difference 0 in the difference frame in FIG. 4D.

Embodiment 2

A motion detection device of Embodiment 2 is substantially the same in configuration as the motion detection device of Embodiment 1. The present embodiment differs from Embodiment 1 in the operation of the motion detection device. The operation of the motion detection device of the present embodiment will now be described with reference to FIGS. 5A to 5P.

In the present embodiment, each frame includes 7×5 macroblocks (112 pixels×80 pixels), and the blocks are numbered as shown in Table 1 below.

TABLE 1

| 0  | 1  | 2  | 3  | 4  | 5  | 6  |
|----|----|----|----|----|----|----|
| 7  | 8  | 9  | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |

In FIGS. 5A to 5P, hatched reference macroblock images are transferred, and a motion estimation is performed for each dotted reference macroblock image. In FIGS. 5B to 5P, the region X is the motion estimation range, the region Y is the region within which the motion estimation range X can be set, and the reference macroblock R is a reference macroblock that is located at the same position as the $N^{th}$ current macroblock in the current frame when a motion detection is performed for the $N^{th}$ current macroblock.

In the following description, the motion estimation range is set so that the reference macroblock R is at the center of the motion estimation range for the sake of simplicity. A reference macroblock numbered "n" (n=0 to 34) as shown in Table 1 above will be denoted as the reference macroblock "n", and a current macroblock numbered n will be denoted as the current macroblock "n".

In the step shown in FIG. 5A, the device prepares for a motion detection for the current macroblock image "0". Specifically, the current image memory control section 5 inputs the current macroblock image "0" to the current memory 3a of the current image memory 3. At the same time, the reference image memory control section 6 transfers a reference macroblock image located at the same position as the current macroblock "0" and the surrounding reference macroblock images from the system memory 2 to the reference image memory 4.

Herein, the reference macroblock located at the same position as the current macroblock "0" is the reference macroblock "0". The surrounding reference macroblocks around the reference macroblock "0" are those that are present within the motion estimation range, which is set to be centered about the reference macroblock "0" referring to Table 1, and are specifically the reference macroblocks "1", "2", "7" to "9" and "14" to "16". The reference macroblock images "0", "7" and "14" are stored in the second-column block region of the reference image memory 4, the reference macroblock images "1", "8" and "15" in the third-column block region of the reference image memory 4, and the reference macroblock images "2", "9" and "16" in the fourth-column block region of the reference image memory 4. In other words, the second to fourth columns of the reference image memory 4 are assigned as the estimation bank memory 14.

Then, in the step shown in FIG. 5B, the device performs a motion detection for the current macroblock image "0", and prepares for a motion detection for the current macroblock image "1".

Specifically, the motion detection section 8 receives the current macroblock image "0" from the current bank memory 3a, and the reference macroblock images "0" to "2", "7" to "9" and "14" to "16" from the estimation bank memory 14. Thus, the motion detection section 8 can perform a motion detection for the current macroblock image "0". Then, since the current macroblock "0" is located at the upper left corner of the image, there is no data present on the left side and the upper side of the current macroblock "0". Therefore, the region on the left side and the region on the upper side of the current macroblock "0" do not need to be set as the motion estimation range X. For example, as shown in FIG. 5B, a region including current macroblocks "0", "1", "7" and "8", among other current macroblocks present within the region Y, may be set as the motion estimation range X.

The current image memory control section 5 stores the current macroblock image "1" in the current bank memory 3b of the current image memory 3. The reference image memory control section 6 transfers those of the reference frame images located at the same position as, or around, the current macroblock "1" that are not stored in the reference image memory 4 (the reference macroblock images "3", "10" and "17" in the illustrated example) from the system memory 2 to the fifth-column bank region of the reference image memory 4. Thus, in this step, the fifth-column block region of the reference image memory 4 is assigned as the spare transfer bank memory 24. It is thus possible to prepare for a motion detection for the current macroblock image "1".

The motion detection operation can be generalized as follows. Where a motion detection is performed for the current macroblock image "n", the current macroblock image "n" is input from the current image memory 3 to the motion detection section 8, and those reference images that are present within the motion estimation range X (i.e., those reference macroblock images that are dotted in the figures) are input from the reference image memory 4 to the motion detection section 8.

The operation of preparing for a motion detection can be generalized as follows. Where the device prepares for a motion detection for the current macroblock image "n+1", the current macroblock image "n+1" is stored in the current image memory 3, and those reference frame images located at the same position as, or around, the current macroblock "n+1" that are not stored in the reference image memory 4 (i.e., those reference macroblock images that are hatched in the figures) are stored in the reference image memory 4. In the steps to be described below, what is already discussed in the generalized description above will not be repeated.

After the step shown in FIG. 5B, the device performs a motion detection for the current macroblock images "1", "2", "3" and "4" successively and prepares for a motion detection for the current macroblock images "2", "3", "4" and "5" successively, as shown in FIGS. 5C to 5F. In the steps shown in FIGS. 5C to 5E, since the current macroblocks "1" to "3" are located at the upper end of the image, there is no data present on the upper side of the current macroblocks "1" to "3". Therefore, the region on the upper side of the current macroblocks "1" to "3" does not need to be set as the motion estimation range X. In the step shown in FIG. 5F, since the current macroblock "4" is located at the upper right end of the image, there is no data on the right side and the upper side of the current macroblock "4". Therefore, the region on the right side and the region on the upper side of the current macroblock "4" do not need to be set as the motion estimation range X.

After the step shown in FIG. 5F, the step shown in FIG. 5G is performed. In this step, the device performs a motion detection for the current macroblock image "5", and prepares for a motion detection for the current macroblock image "6".

When preparing for a motion detection in this step, there are reference macroblocks "4", "5", "11" "12", "18" and "19" present within the motion estimation range centered about the reference macroblock "6". However, these reference macroblock images have already been stored in the reference image memory 4 in the step shown in FIG. 5F. Accordingly, in this step, the device does not prepare for a motion detection for the current macroblock image "6". Instead, the device prepares for a motion detection for the current macroblock image "7". Specifically, the reference macroblock images "0", "7", "14" and "21" are transferred from the system memory 2 to the reference image memory 4.

In the step shown in FIG. 5G, since the current macroblock "5" is located on the upper left end of the image, the region on the left side and the region on the upper side of the current macroblock "5" do not need to be set as the motion estimation range X.

Then, in the step shown in FIG. 5H, the device performs a motion detection for the current macroblock image "6", and prepares for a motion detection for the current macroblock image "7". Since the current macroblock "6" is located on the upper end of the image, the region on the upper side of the current macroblock "6" does not need to be set as the motion estimation range "X".

There are reference macroblocks "0" to "2", "7" to "9", "14" to "16" and "21" to "23" present within the motion estimation range X centered about the reference macroblock "7", and the reference macroblock images "2", "9", "16" and "23", among others, are not stored in the reference image memory 4. Accordingly, in this step, the reference macroblock images "2", "9", "16" and "23" are transferred from the system memory 2 to the reference image memory 4.

After the step shown in FIG. 5H, the device performs a motion detection for the current macroblock images "7" to "14" successively and prepares for a motion detection for the current macroblock images "9" to "15" successively, as shown in FIGS. 5I to 5P. Then, similar operations are repeated until a motion detection is performed for the current macroblock image "34".

Thus, with the motion detection device of the present embodiment, it is possible to change the assignment of the estimation bank memory 14 and the spare transfer bank memory 24 of the reference image memory 4 each time a motion detection is performed. If the assignment of the estimation bank memory and the spare transfer bank memory of the reference image memory has been determined, the image data needs to be transferred from the spare transfer bank memory to the estimation bank memory. However, in the present embodiment, it is not necessary to transfer the image from the spare transfer bank memory to the estimation bank memory, thus realizing a more efficient motion detection. When a motion detection is performed for a current macroblock image located at an end of the image, a reference macroblock located outside the image does not need to be set as the estimation range X. Therefore, the motion detection can be performed more efficiently.

Embodiment 3

In Embodiment 3, not only is it possible to change the motion estimation range each time a motion detection is performed, but also can the motion estimation range be expanded if the image involves even more substantial movements. The following description of the present embodiment will focus on what is different from the motion detection device of Embodiment 1 or 2.

Figure 6:
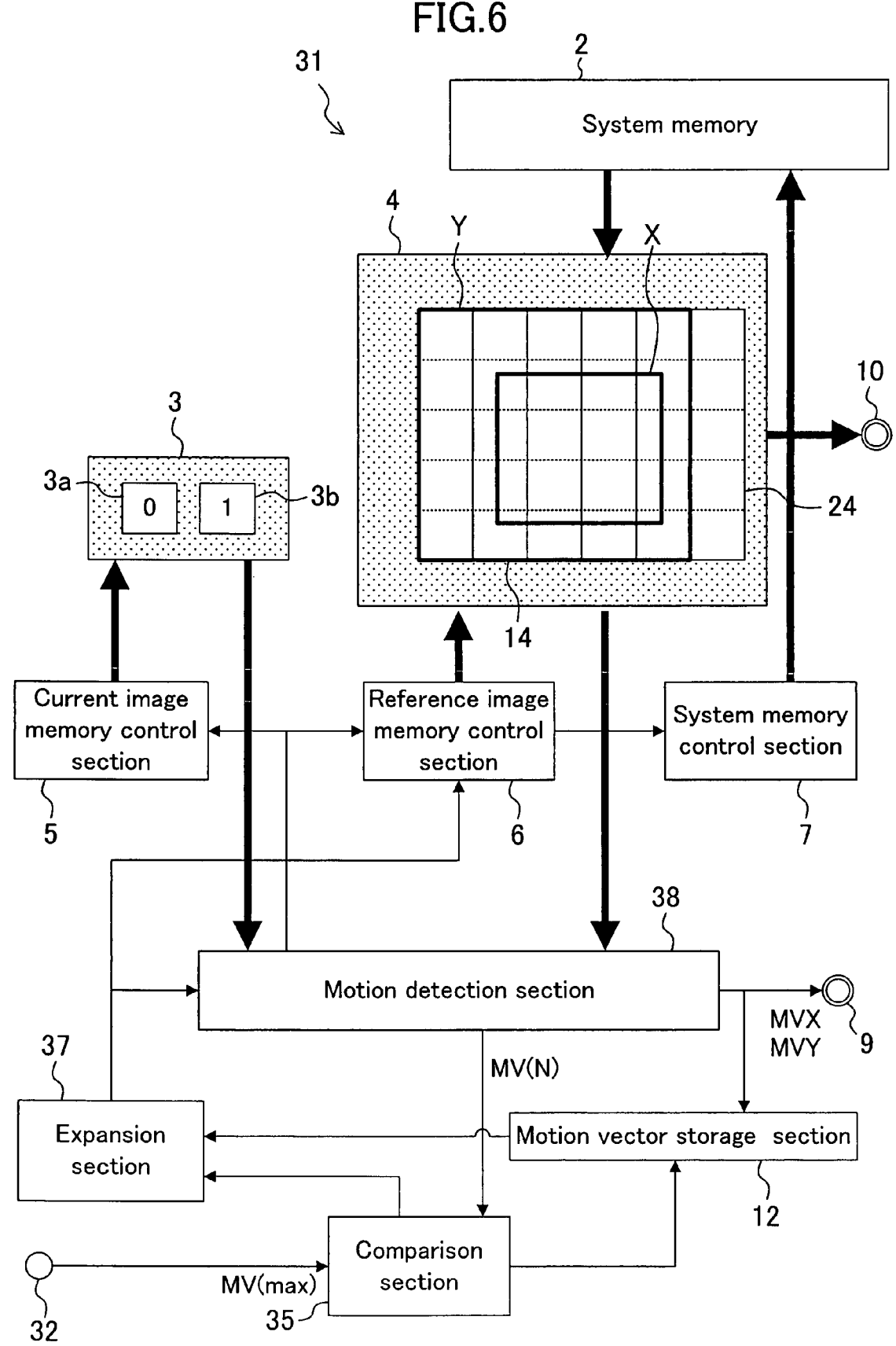
FIG. 6 is a block diagram showing a configuration of a motion detection device according to Embodiment 3.

FIG. 6 is a diagram showing a configuration of a motion detection device 31 of the present embodiment. The motion detection device 31 of the present embodiment further includes a comparison section 35 and an expansion section 37.

The comparison section 35 receives a predetermined motion vector MV(max) from an external terminal 32, and receives a motion vector MV(N) calculated in a motion detection section 38. Upon receiving these vectors, the comparison section 35 compares the magnitude of MV(N) and that of MV(max) to thereby input the comparison result to the expansion section 37.

The expansion section 37 determines the size of the motion estimation range based on the comparison result from the comparison section 35. Specifically, if MV(max)≧MV(N), the expansion section 37 does not expand the motion estimation range. If MV(N)<MV(max), the expansion section 37 expands the motion estimation range, and inputs, to the reference image memory control section 6 and the motion detection section 38, information indicating that the motion estimation range has been expanded.

Where the information indicating that the motion estimation range has been expanded is input to the reference image memory control section 6, the reference image memory control section 6 expands the motion estimation range when determining the motion estimation range, and increases the amount of image data to be transferred from the system memory 2 to the reference image memory 4.

Where the information indicating that the motion estimation range has been expanded is input to the motion detection section 38, the motion detection section 38 increases the amount of image data to be input from the reference image memory 4 to the motion detection section 38.

Thus, according to the present embodiment, it is possible not only to change the motion estimation range each time a motion estimation is performed as described above in Embodiment 1, but it is also possible to expand the motion estimation range when the image involves substantial movements. Therefore, it is possible to further increase the motion estimation precision as compared with that of Embodiment 1.

The present embodiment may alternatively be configured as follows.

For example, the comparison section may compare MVX(max) with MVX(N) with each other and MVY(max) with MVY(N). The expansion section may expand the motion estimation range both in the X direction and in the Y direction if MVX(max)<MVX(N) and MVY(max)<MVY(N), whereas the expansion section may expand the motion estimation range only in the X direction if MVX(max)<MVX(N) and MVY(max)≧MVY(N). Then, it is preferred that MVX(max) and MVY(max) are input from the external terminal to the comparison section, and MVX(N) and MVY(N) are input from the motion detection section to the comparison section.

The comparison section may alternatively be configured to make comparisons with respect to the direction of motion vectors.

Embodiment 4

Figure 7:
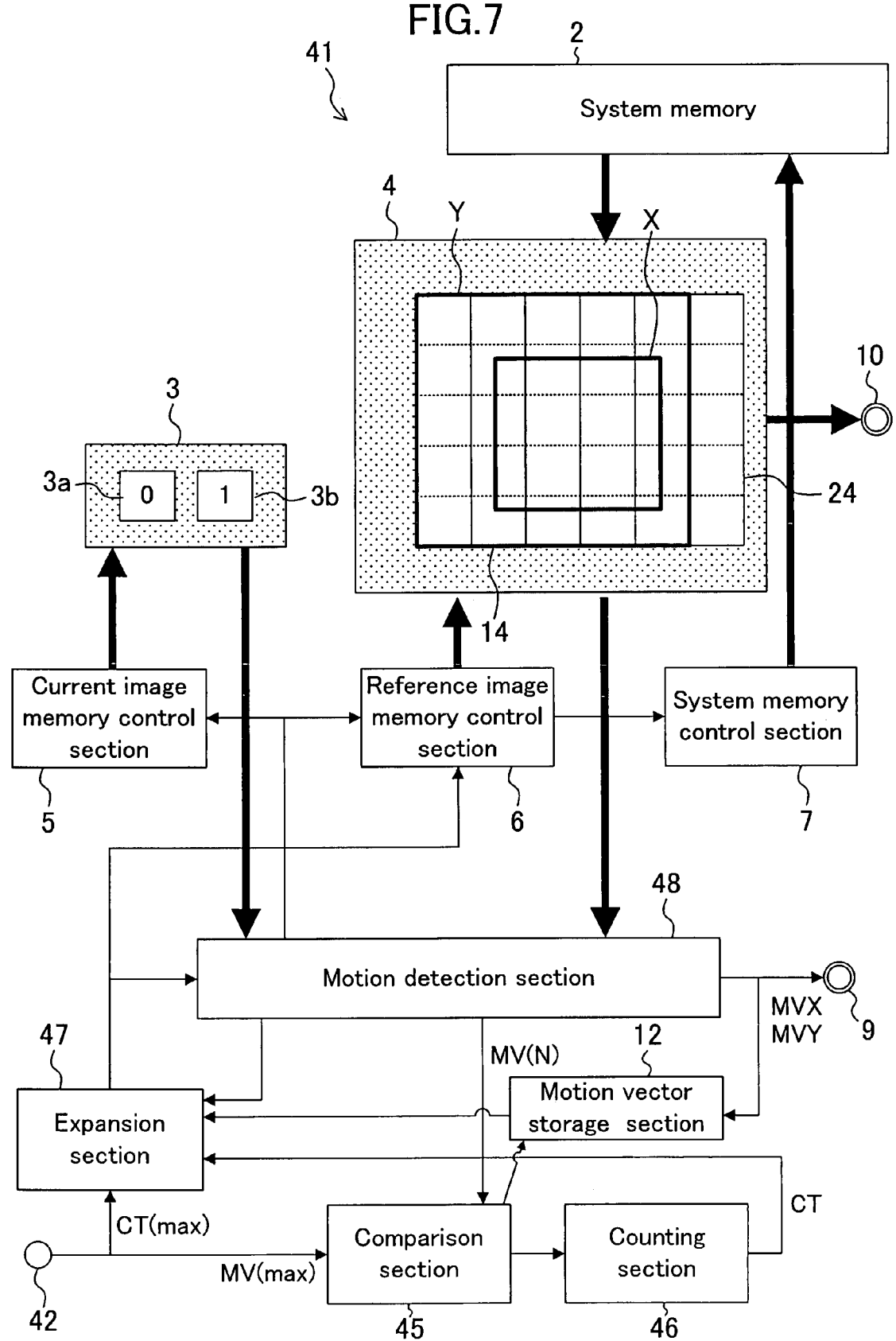
FIG. 7 is a block diagram showing a configuration of a motion detection device according to Embodiment 4.

Embodiment 4 differs from Embodiment 3 in the way determinations are made in the expansion section. FIG. 7 is a diagram showing a configuration of a motion detection device 41 of the present embodiment. The following description of the present embodiment will focus on what is different from the motion detection device of Embodiment 3.

A motion detection device 41 of the present embodiment further includes a counting section 46, and the counting section 46 counts the number of current macroblocks where MV(max)<MV(N), of all the current macroblocks in one current frame.

Specifically, a comparison section 45 compares the magnitude of MV(N) detected by a motion detection section 48 with that of MV(max) input from an external terminal 42, and increments the count (CT) of the counting section 46 by one if MV(max)<MV(N).

An expansion section 47 compares the count (CT) input from the counting section 46 with CT (max) input from the external terminal 42. The expansion section 47 does not expand the motion estimation range if CT≦CT(max), and expands the motion estimation range if CT>CT(max).

Alternatively, the counting section may count the number of current macroblocks where MV(max)<MV(N), of all the current macroblocks in one block line.

Thus, the present embodiment provides substantially the same effects as those of Embodiment 3.

Embodiment 5

FIG. 8 is a diagram showing a configuration of a motion detection device of Embodiment 5. The following description of the present embodiment will focus on what is different from the motion detection device of Embodiment 1.

Where a motion detection is performed, it is typical to perform, in addition to the motion estimation, DCT (Discrete Cosine Transform), quantization, inverse quantization, inverse DCT, motion prediction, encoding, etc. Therefore, it is often the case that an amount of time available ("a predetermined amount of time") is determined for each operation.

If the motion estimation range is expanded as with the motion detection devices of Embodiments 3 and 4, the amount of time spent for the motion estimation may exceed the predetermined amount of time. If the amount of time spent for the motion estimation exceeds the predetermined amount of time, the motion estimation by the motion detection section may possibly be stopped, thereby decreasing the precision of the motion estimation.

A motion detection device 51 of the present embodiment further includes a measurement section 54. The measurement section 54 measures the amount of time spent for the motion estimation, and reports the measurement results to a motion detection section 58.

In addition to the operations performed by the motion detection sections 8, 38 and 48 of Embodiments 1 to 4 described above, the motion detection section 58 of the present embodiment determines whether the amount of time spent for the motion estimation exceeds the predetermined amount of time, and extends the predetermined amount of time if it is determined that the amount of time spent for the motion estimation exceeds the predetermined amount of time. Thus, even if the amount of time spent for the motion estimation exceeds the predetermined amount of time, it is ensured that the motion estimation is not discontinued before it is completed.

Figure 9A:
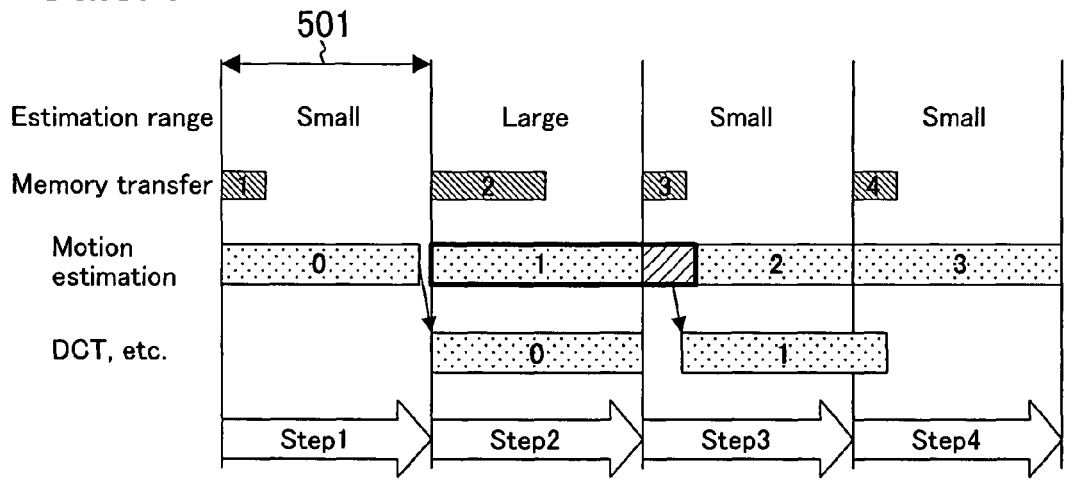
FIGS. 9A to 9C are diagrams illustrating an operation of a motion detection device according to Embodiment 5.
Figure 9B:
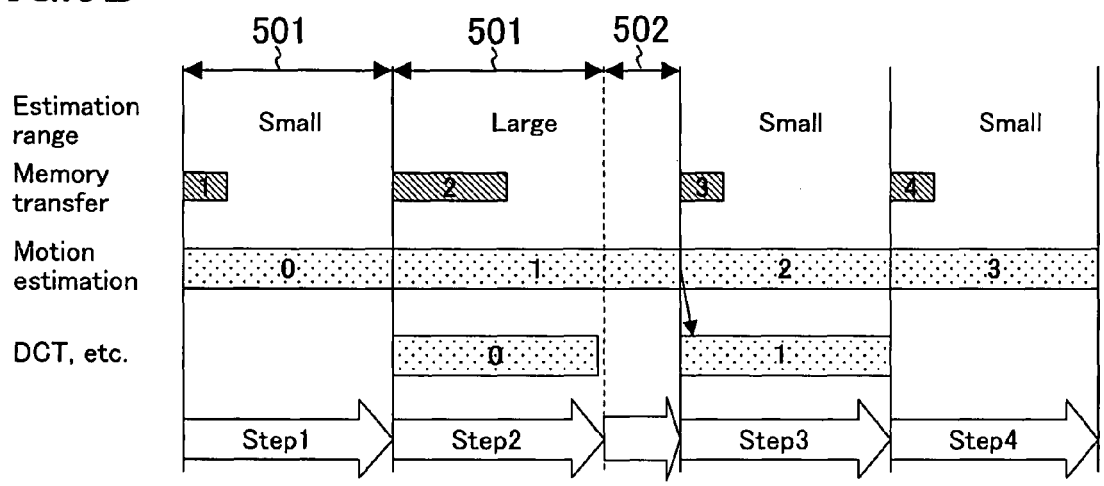
Figure 9C:
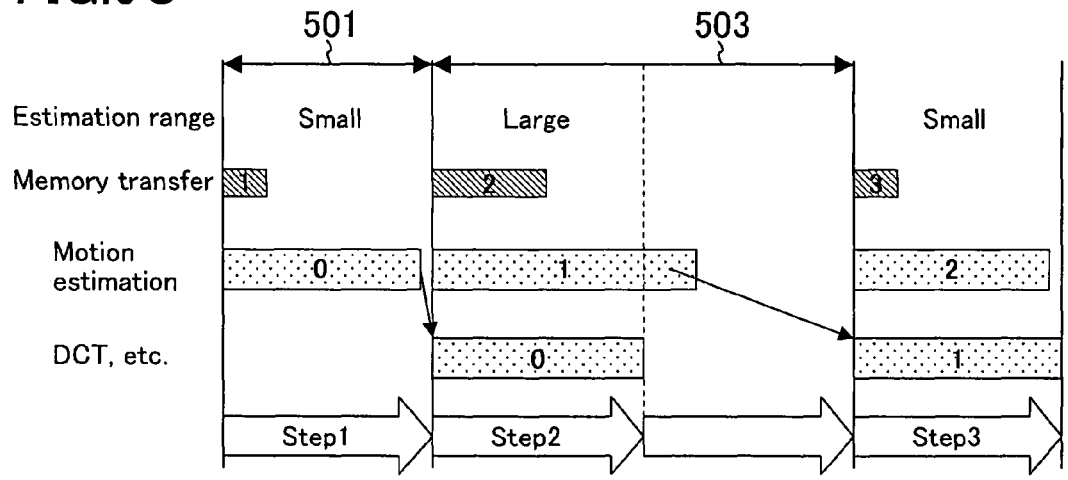

More detailed description is given below with reference to FIGS. 9A to 9C. FIGS. 9A to 9C are diagrams each schematically showing the allotment of time for the motion detection device, wherein FIG. 9A shows the allotment of time for the motion detection device of Embodiment 3 or 4, and FIGS. 9B and 9C each show the allotment of time for the motion detection device of the present embodiment.

In FIGS. 9A to 9C, the term "estimation range" denotes the size of the estimation range, whereas "memory transfer", "motion estimation" and "DCT etc." each denote the amount of time spent for the operation.

In the example shown in FIG. 9A, the amount of time spent for the motion estimation for step 2 exceeds a predetermined amount of time 501. Therefore, the motion detection section 8 is still performing the motion estimation for step 2 even after it is time for performing the motion estimation for step 3, whereby the precision of the motion estimation in step 3 may deteriorate.

In the example shown in FIG. 9B, since the motion estimation time for step 2 exceeds the predetermined amount of time 501, the motion detection section 58 allocates the predetermined amount of time 501 and a time extension 502 for the motion estimation in step 2. Thus, the predetermined amount of time for step 2 can be extended, and it is possible to suppress the decrease in the precision of the motion estimation for step 3, as opposed to the case of FIG. 9A.

In the example shown in FIG. 9C, the motion detection section 58 allocates an amount of time 503, twice as long as the predetermined amount of time 501, to the motion estimation in step 2. Thus, it is possible to extend the predetermined amount of time for step 2.

Thus, according to the present embodiment, not only is it possible to change the motion estimation range each time a motion estimation is performed as described above in Embodiment 1, but also can the predetermined amount of time be extended if the amount of time spent for the motion estimation exceeds the predetermined amount of time so that the next motion estimation is performed after the current motion estimation is completed. Therefore, it is possible to prevent a motion estimation from being discontinued before it is completed, and it is possible to prevent the amount of time for the next motion estimation from being decreased.

The present embodiment illustrates an example where the motion estimation time exceeds a predetermined amount of time. The present invention can also be applicable to a case where the amount of time spent for memory transfer exceeds a predetermined amount of time, or a case where the amount of time spent for other processes such as DCT exceeds a predetermined amount of time.

While the motion detection section extends the motion estimation time in the present embodiment, a control section for controlling the motion detection section may alternatively extend the motion estimation time.

Embodiment 6

Embodiment 6 is directed to an integrated circuit including a motion detection device according to one of Embodiments 1 to 5.

Figure 10:
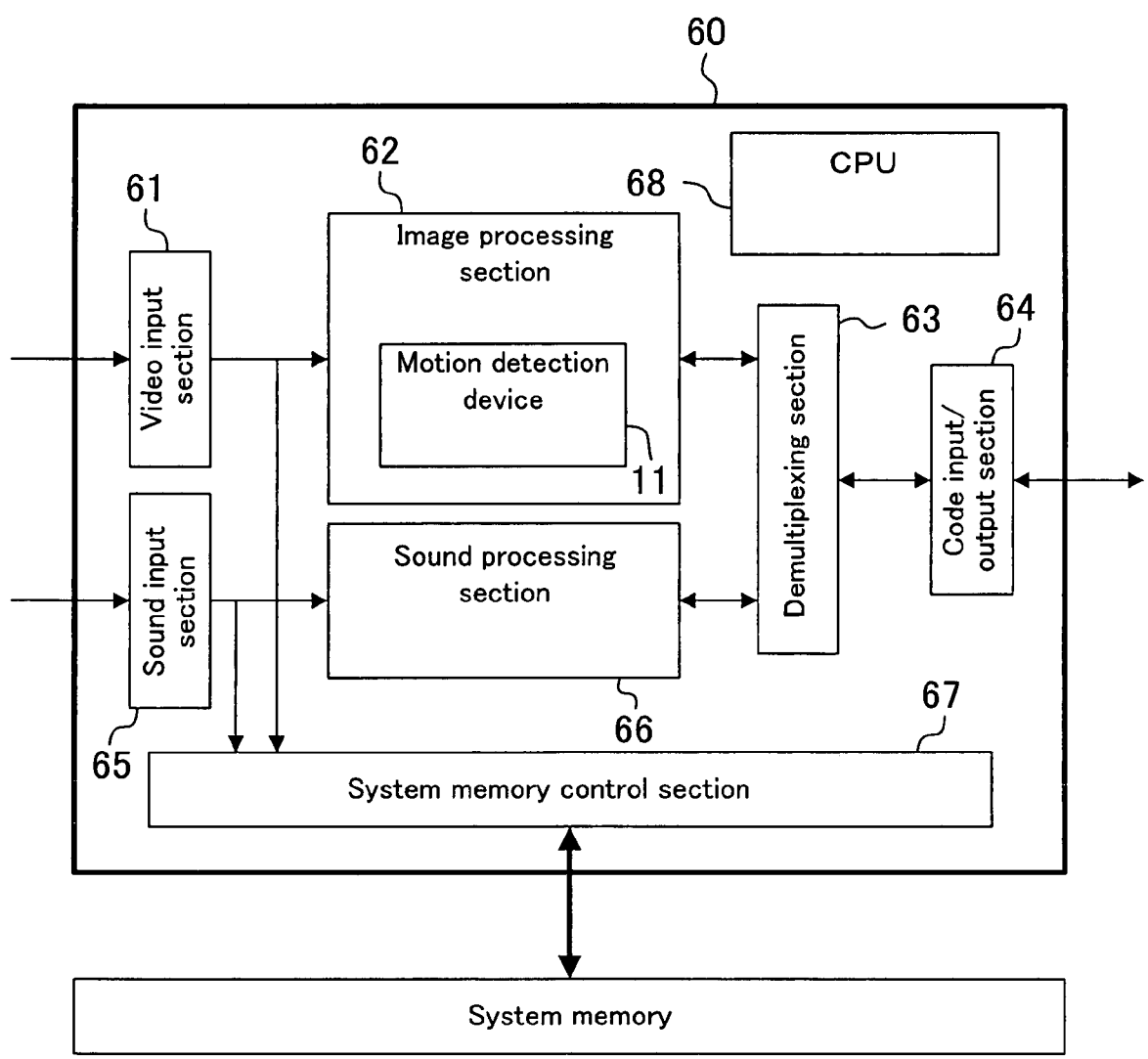
FIG. 10 is a block diagram showing a configuration of an MOS integrated circuit according to Embodiment 6.

FIG. 10 is a block diagram showing an integrated circuit (specifically, a MOS integrated circuit) 60 of the present embodiment. The MOS integrated circuit 60 performs an encoding process and a decoding process.

Where an encoding process is performed by the MOS integrated circuit 60 of the present embodiment, video data is input to a video input section 61, the video input section 61, being controlled by a CPU 68, transfers video data to a system memory control section 67 or an image processing section 62, and the image processing section 62 encodes the video data and outputs the encoded signal to a demultiplexing section 63.

Moreover, sound data is input to a sound input section 65, and the sound input section 65, being controlled by the CPU 68, transfers the sound data to the system memory control section 67 or a sound processing section 66. Then, the sound processing section 66 encodes the sound data and outputs the sound signal to the demultiplexing section 63.

Then, the demultiplexing section 63 multiplexes the encoded signal and the sound signal, and the multiplexed signal is output to the outside of the MOS integrated circuit 60 (e.g., to the system memory) via the code input/output section 64.

Where a decoding process is performed by the MOS integrated circuit 60, multiplexed code data is input to a code input/output section 64 and output to the demultiplexing section 63. The demultiplexing section 63 demultiplexes the multiplexed code data into a video signal and a sound signal, which are input to the image processing section 62 and the sound processing section 66, respectively.

The configuration of the MOS integrated circuit is not limited to the configuration described above. Specifically, while the MOS integrated circuit is shown in FIG. 10 to include the motion detection device of Embodiment 1, the MOS integrated circuit may alternatively include a motion detection device of any one of Embodiments 2 to 5, and the system memory may be provided in the MOS integrated circuit.

Embodiment 7

Embodiment 7 is directed to a video system including a motion detection device according to one of Embodiments 1 to 5. As a specific example of the video system, an image pickup system for a digital still camera will now be described.

Figure 11:
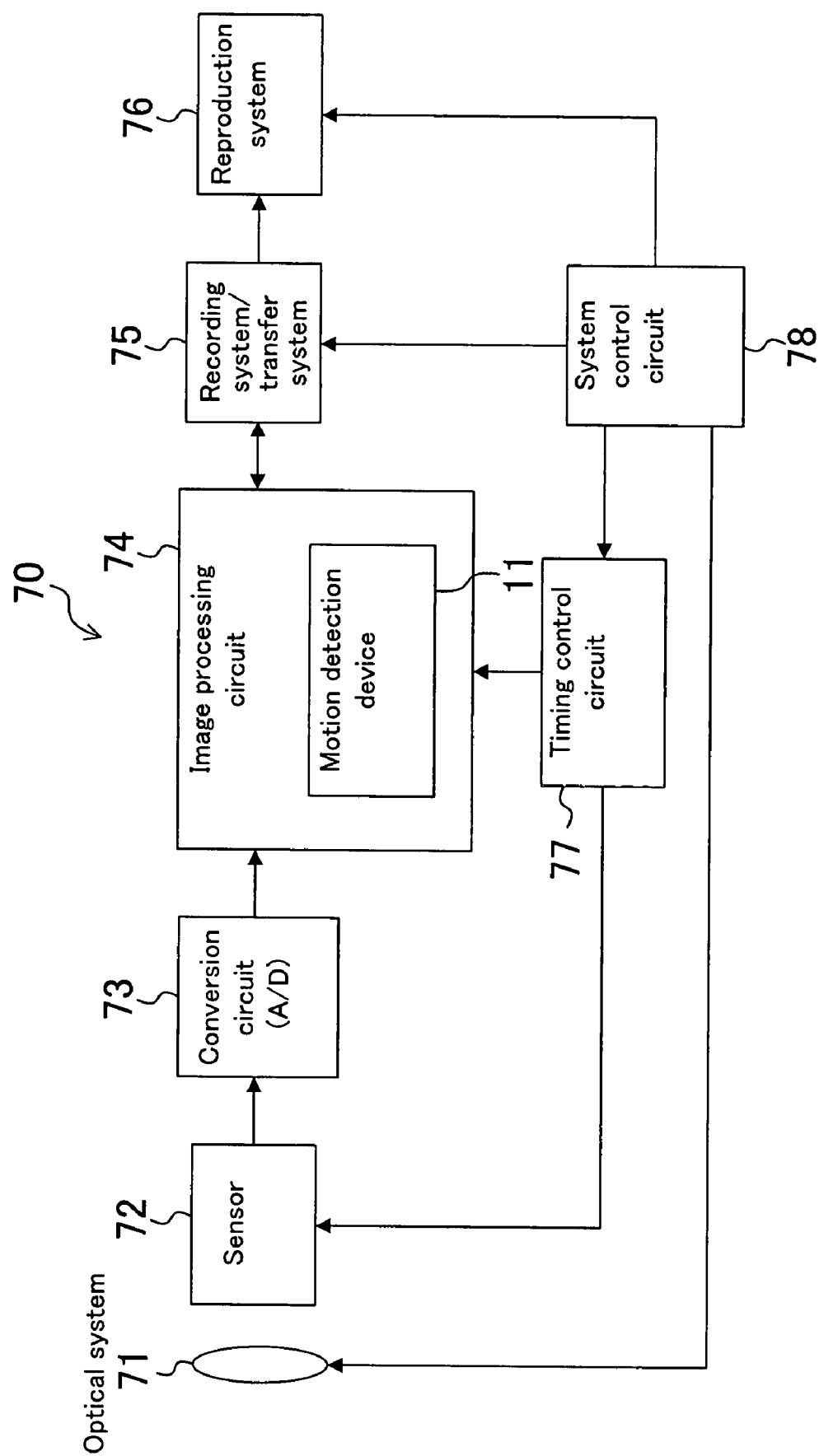
FIG. 11 is a block diagram showing a configuration of a video system according to Embodiment 7.

FIG. 11 is a block diagram showing a configuration of an image pickup system 70 for a digital still camera of the present embodiment.

With the image pickup system 70 of the present embodiment, an image (optical signal) is incident upon an optical system 71 to form an image on a sensor 72, where it is photoelectrically converted into an electric signal. The electric signal is digitally converted by a conversion circuit (A/D) 73, and then input to an image processing circuit 74. The image processing circuit 74 performs processes such as a Y/C process, an edge process, an image enlargement/shrinking and an image compression/decompression process of a JPEG format, an MPEG format, or the like. The processed signal is recorded on or transferred to a medium by a recording system/transfer system 75, and the recorded or transferred signal is reproduced by a reproduction system 76.

The sensor 72 and the motion detection device 11 are controlled by a timing control circuit 77, and the optical system 71, the recording system/transfer system 75, the reproduction system 76 and the timing control circuit 77 are each controlled by a system control circuit 78.

The configuration of the video system is not limited to the configuration described above. Specifically, where a video signal (an analog signal) from AV equipment such as a television set is input, the video system does not need to include the optical system and the sensor, wherein the video signal from the AV equipment is input directly to the A/D conversion circuit 73.

While the motion detection device of the present invention has been described above in Embodiments 1 to 5, the motion detection device of the present invention may alternatively be one of Embodiments 8 to 11 to be described below.

Embodiment 8

Figure 12:
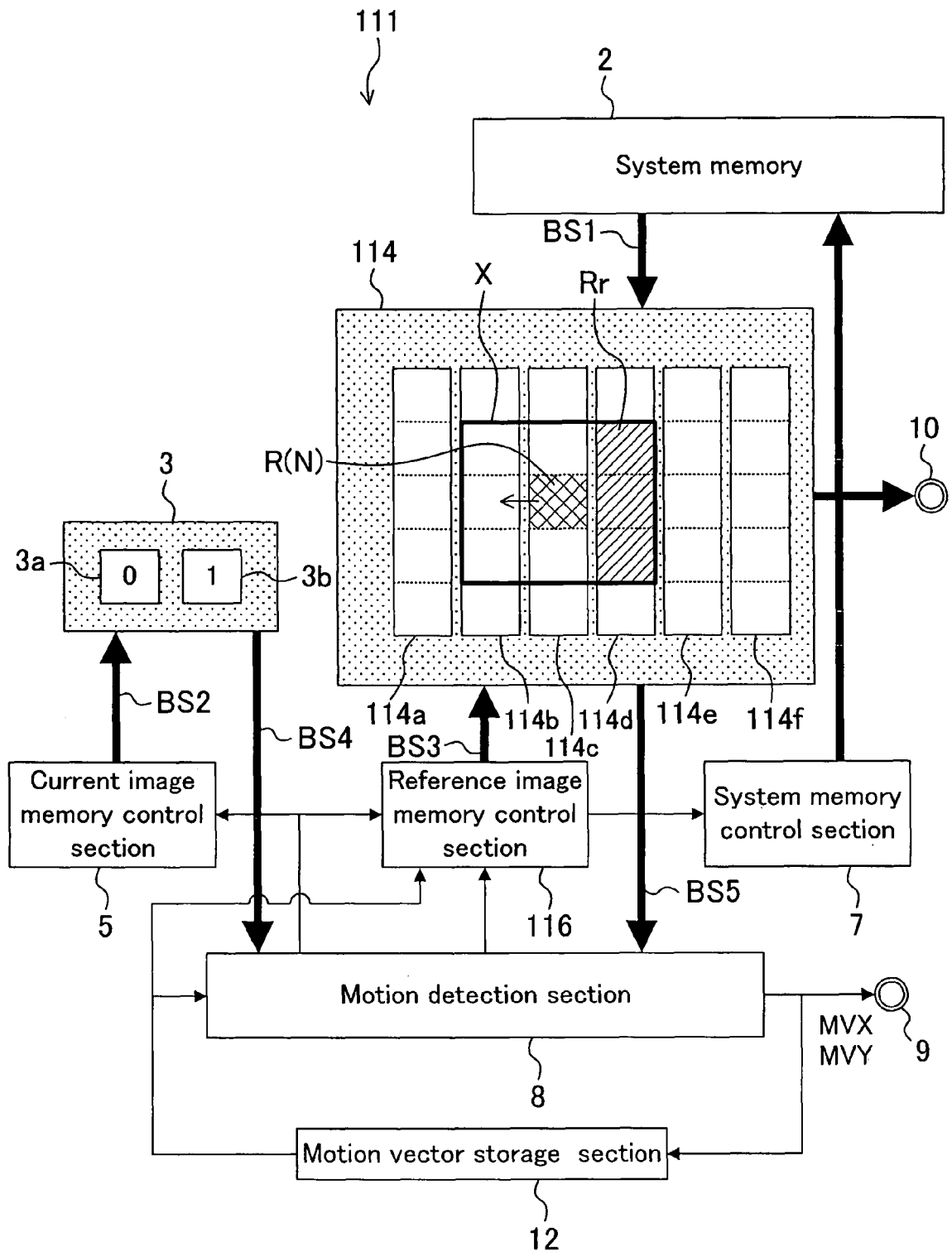
FIG. 12 is a block diagram showing a configuration of a motion detection device according to Embodiment 8.

FIG. 12 is a diagram showing a configuration of a motion detection device 111 of Embodiment 8.

In the present embodiment, a reference image memory 114 includes six single-port SRAMs 114a to 114f, which can be controlled independently. Thus, a reference memory control section 116 can stop supplying the power to those SRAMs that are not currently being used, whereby it is possible to reduce the amount of power to be consumed by the motion detection device 111. This will be described in greater detail below.

Consider a case where the motion estimation range X has a size of 3×3 and an estimation is being performed in the leftward direction in the figure with respect to the reference macroblock R(N) as shown in the reference image memory 114 of FIG. 12. Then, reference macroblock images Rr to the right of the reference macroblock R(N) are not referred to, and the reference image memory control section 116 accordingly stops supplying the power to the right SRAM 114d. Thus, it is possible to reduce the amount of power to be consumed by the motion detection device 111.

In the example shown in FIG. 12, the SRAM arrangement in the reference image memory is 1×5. Alternatively, the SRAM arrangement may be 1×1 or 5×1. Where the SRAM arrangement is 1×1, the reference image memory control section can control the reference image memory even more finely, whereby it is possible to further reduce the power consumption.

Embodiment 9

Figure 13:
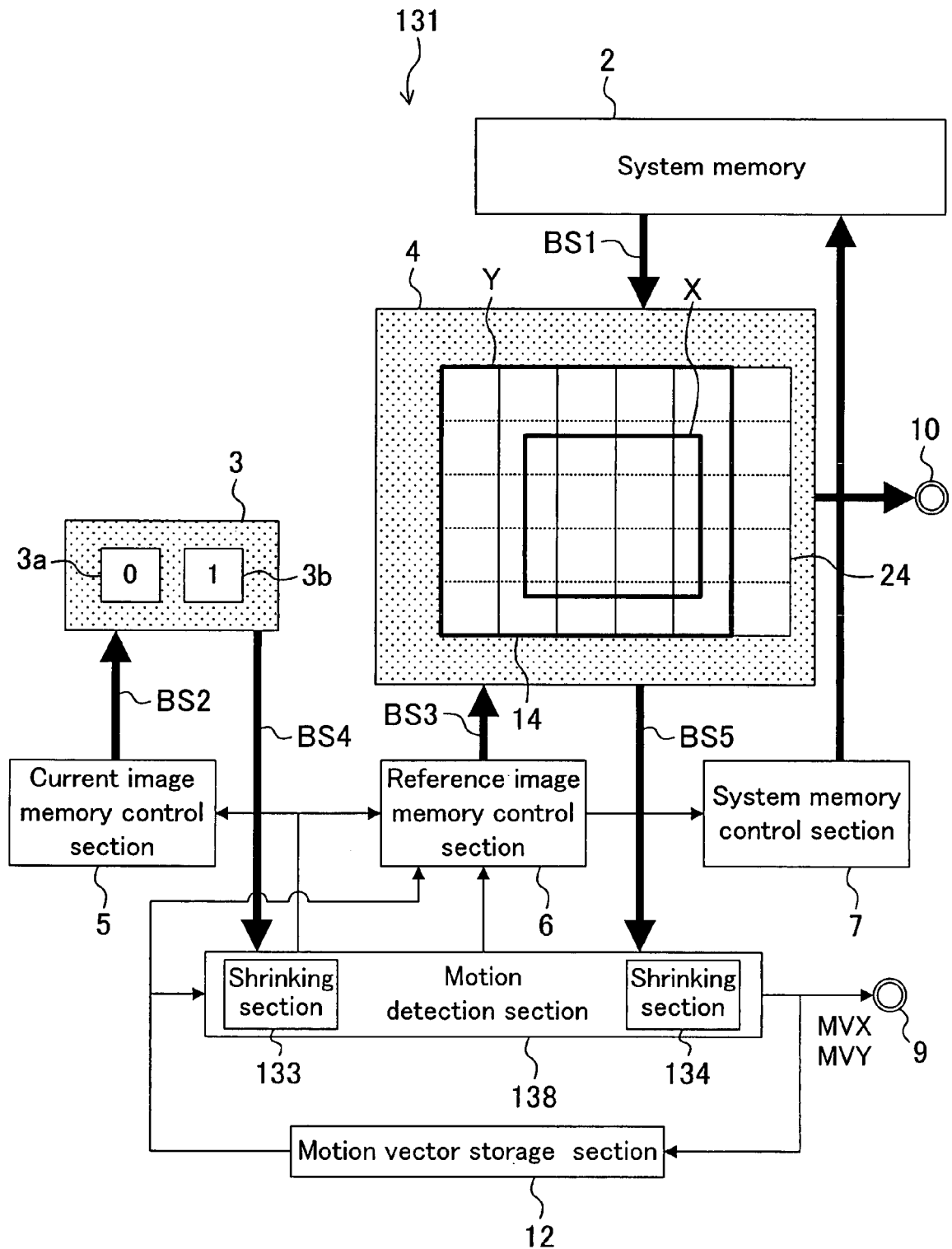
FIG. 13 is a block diagram showing a configuration of a motion detection device according to Embodiment 9.

FIG. 13 is a diagram showing a configuration of a motion detection device 131 of Embodiment 9.

In the present embodiment, a motion detection section 138 includes shrinking sections 133 and 134. The shrinking section 133 (the first shrinking section) shrinks the $N^{th}$ current macroblock image when performing a motion detection for the $N^{th}$ current macroblock image. The shrinking section 134 (the second shrinking section) shrinks the image present within the motion estimation range. Thus, it is possible to shorten the amount of time to be spent for the motion estimation.

While the shrinking sections are provided in the motion detection section, they may be provided outside the motion detection section.

Embodiment 10

Embodiment 10 is directed to a method for allocating the amount of data transfer to a motion estimation.

As described above in Embodiment 5, a motion detection device typically performs a motion estimation and other processes simultaneously. In order to perform a motion estimation or other processes, data may need to be transferred, and there is an upper limit for the amount of data that can be transferred. Therefore, the total amount of data that can be transferred is shared between the motion estimation and other processes so that the processes can be performed at a high speed. A method for allocating an amount of data transfer to a motion estimation with respect to the amount of data transfer available of the system memory.

An exemplary method is as follows. The maximum bandwidth BW(max) of the system memory is given as BW(max) =F×W, where F is the frequency of the memory and W is the bus width. Herein, the motion detection section knows the maximum bandwidth BW(max), and allocates a required bandwidth to the motion estimation so that the allocated bandwidth and the bandwidth required for other processes together do not exceed BW(max).

Another exemplary method is as follows. Where {(bandwidth required for motion estimation)+(bandwidth required for other processes)}<BW(max), the motion detection section allocates the excessive bandwidth to the motion estimation, and the motion estimation range is expanded by a method described above in Embodiment 3 or 4.

Embodiment 11

In Embodiment 11, it is determined whether it is necessary to expand the motion estimation range based on a signal received from the outside of the motion detection device.

Figure 14:
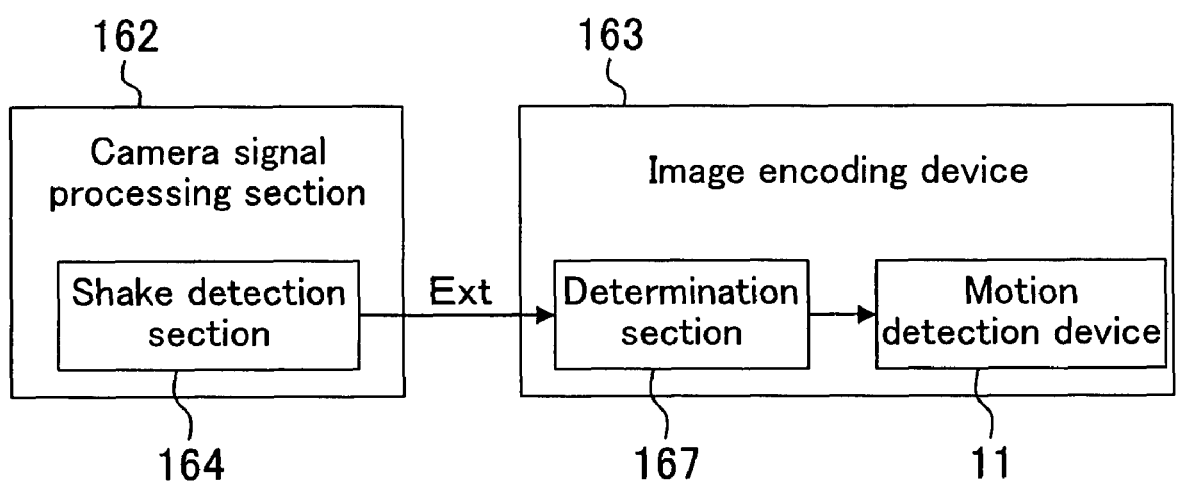
FIG. 14 is a block diagram showing a configuration of a motion detection device according to an example of Embodiment 11.

An example of the present embodiment is as follows. Referring to FIG. 14, a determination section 167 of an image encoding device 163 determines whether it is necessary to expand the motion estimation range based on information (Ext) input from a shake detection section 164 of a camera signal processing section 162. If the determination section 167 determines that the expansion is necessary, the motion detection device 11 expands the motion estimation range, and if the determination section 167 determines that the expansion is not necessary, the motion detection device 11 does not expand the motion estimation range.

The camera signal processing section 162 is provided in a digital camera or a video camera. If the camera is shaken when the operator operates the camera to take a video image of an object, the position, or the like, of the object will differ between two consecutive frames. The shake detection section 164 detects a positional shift of an object due to camera shake, whereby it is possible to obtain the information (Ext) regarding the positional shift of the object.

Another example of the present embodiment is as follows. Referring to FIG. 15, a control section 173 is provided in a motion detection device 171, and a switch 174 is provided in the control section 173. The switch 174 is configured so that a normal mode 174a and an expansion mode 174b can be switched to one another. For example, when the mode is switched from the normal mode 174a to the expansion mode 174b, a motion detection section 178 expands the motion estimation range. When the mode is switched from the expansion mode 174b to the normal mode 174a, the motion detection section 178 brings the motion estimation range back to the size before expansion.

Still another example of the present embodiment is as follows. Although not shown in the figures, the motion detection section determines whether an image quality required by the user, or the like, (referred to as the "required image quality") is higher than the image quality of the system. The motion detection section does not expand the motion estimation range if the required image quality is lower than the image quality of the system, but the motion detection section expands the motion estimation range if the required image quality is higher than the image quality of the system.

What is claimed is:

1. A motion detection device for performing a motion detection for a current frame image by referring to a reference frame image, said motion detection device comprising:
   a current image memory for storing at least a first one of a plurality of current macroblock images, which together form the current frame image;
   a reference image memory for storing, as a reference image, a subset of a plurality of reference macroblock images, which together form the reference frame image;
   a reference image memory control section for storing the reference image in the reference image memory or outputting those of the reference images that are present within a motion estimation range from the reference image memory; and
   a motion detection section for performing a motion estimation for those of the reference images that are present within the motion estimation range and detecting a motion vector for the first current macroblock image,
   wherein when the motion detection section detects a motion vector for the first current macroblock image, the reference image memory control section determines an estimation starting point for the first current macroblock image to be a point reached by moving from one point within the first current macroblock image by a surrounding motion vector which is a motion vector detected for a current macroblock image present around the first current macroblock image, and determines the motion estimation range so that the current macroblock image in which the estimation starting point is present is located at a center of the motion estimation range.

2. The motion detection device of claim 1, wherein when detecting the motion vector for the first current macroblock image, the motion detection section recognizes those of the reference images that are present within the motion estimation range and receiving those reference images from the reference image memory.

3. The motion detection device of claim 1, further comprising:
   a comparison section for determining whether a magnitude of the motion vector of the first current macroblock image is greater than a predetermined motion vector magnitude; and
   an expansion section for expanding the motion estimation range when the comparison section determines that the size of the motion vector of the first current macroblock image is greater than the predetermined motion vector magnitude.

4. The motion detection device of claim 1, further comprising a measurement section for measuring an amount of time spent for a motion estimation,
   wherein the motion detection section determines whether the amount of time spent for the motion estimation exceeds a predetermined amount of time, and extends the predetermined amount of time if it is determined that the amount of time spent for the motion estimation exceeds the predetermined amount of time.

5. The motion detection device of claim 1, further comprising:
   first shrinking means for shrinking the first current macroblock image; and
   second shrinking means for shrinking those of the reference images that are present within the motion estimation range.

6. The motion detection device of claim 1, wherein the motion detection section determines a size of the motion estimation range based on an amount of data transfer allocated to the motion estimation.

7. The motion detection device of claim 1, wherein:
   the motion detection device has an expansion mode in which the motion estimation range is expanded and a motion estimation is performed, and a normal mode in which a motion estimation is performed without expanding the motion estimation range, and the motion detection device comprises a switch capable of switching between the expansion mode and the normal mode; and
   the motion detection section performs the expansion mode or the normal mode according to a position of the switch.

8. A MOS integrated circuit, comprising the motion detection device of claim 1.

9. A video system, comprising the motion detection device of claim 1, and an analog/digital conversion section for converting an input analog signal to a digital signal and outputting the digital signal to the motion detection device.

* * * * *